UNITED STATES PATENT OFFICE.

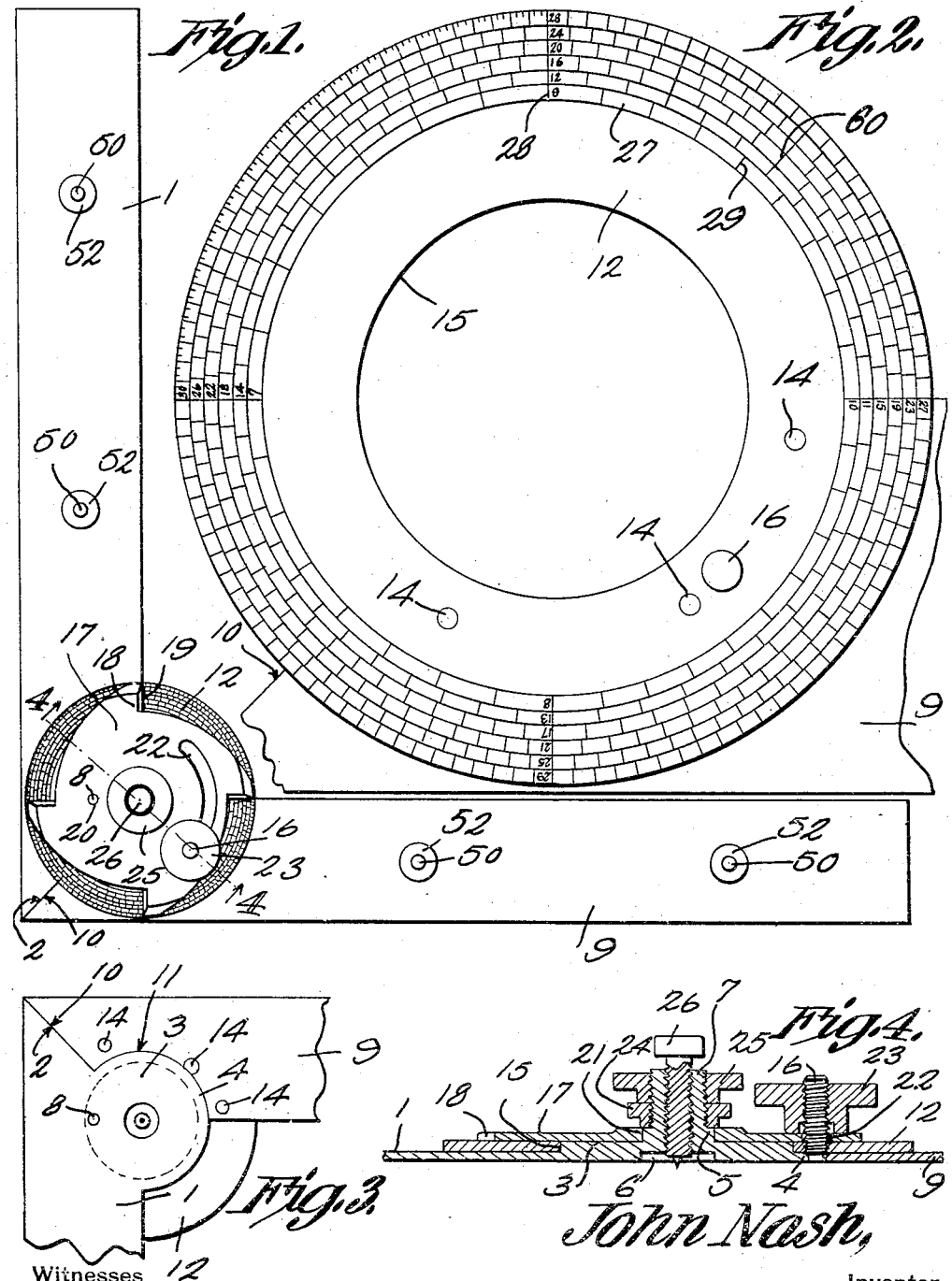

JOHN NASH, OF DRYDEN, OREGON.

ADJUSTABLE TRIANGLE AND GEAR-TOOTH PLOTTER.

1,251,809.  Specification of Letters Patent.  Patented Jan. 1, 1918.

Application filed March 1, 1917. Serial No. 151,803.

*To all whom it may concern:*

Be it known that I, JOHN NASH, a citizen of the United States, residing at Dryden, in the county of Josephine and State of Oregon, have invented a new and useful Adjustable Triangle and Gear-Tooth Plotter, of which the following is a specification.

The device forming the subject matter of this application is adapted to be employed for laying off gear teeth, and for other like purposes, and one object of the invention is to provide a novel means whereby gear wheels having different numbers of teeth may be plotted readily.

The invention aims to improve the pivotal connection between the arms of the device, whereby the result above enumerated may be brought about.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a device constructed in accordance with the present invention;

Fig. 2 is an enlarged detail showing the graduated head and portion of one arm;

Fig. 3 is a fragmental bottom plan of the structure; and

Fig. 4 is a section taken approximately on the line 4—4 Fig. 1.

In the accompanying drawings, the numeral 1 indicates an arm having a beveled edge 2 and provided with a hub 3 having an outstanding flange 4. In the lower face of the hub 3 a recess 6 is formed. A boss 5 projects from the hub 3 and carries a tubular socket 7 which is threaded externally and internally. Fixed to the hub 3 is a stud 8.

The numeral 9 denotes an arm having a beveled edge 10 coöperating with the beveled edge 2 of the arm 1 to cause the arms to define a right angle. The arm 9 has a recess 11 which receives the flange 4 of the hub 3. Applied to the upper face of the arm 9 is a circular head 12 held to the arm 9 by means of securing elements 14, if the head and the arm are separate pieces, as is not obligatory. The head 12 has a circular opening 15 which receives the hub 3 of the arm 1. Projecting from the head 12 is a screw 16.

Superposed on the head 12 is a removable indicator 17 which, roughly described, is shaped like a buzz saw and includes teeth 18 having radial, fiducial edges 19. Indicator 17 is provided with an opening 20 receiving the stud 8 on the hub 3. The indicator 17, therefore, moves with the arm 1, and the head 12 moves with the arm 9. The indicator 17 has an opening 21 in which the boss 5 of the hub 3 is journaled. The indicator 17 is supplied with an arcuate slot 22 through which the screw 16 passes, to permit relative rotatory movement between the indicator 17 and the head 12 when the arms 1 and 9 are swung toward and away from each other. A nut 24 is threaded onto the socket 7 and is held in place by a lock nut 25. The nuts 24 and 25, coöperating with the socket 7 unite the arms 9 and 1 for relative swinging movement. A nut 23 is threaded onto the screw 16. The nut 23 is adapted to bear on the indicator 17 at each side of the slot 22, and thus the arms 9 and 1 may be clamped at any desired angle. A center point 26 is threaded into the socket 7 and extends downwardly into the recess 6. The upper face of the head 12 is provided with concentric annular scales 27. The scales 27 are divided by radial lines 28 into four parts each. The parts of the several scales are further sub-divided as shown at 29. The parts of each scale are sub-divided into a different number of parts. Thus, considering the innermost scale, the quadrants of this scale are divided, respectively, into seven parts, eight parts, nine parts and ten parts. Similarly, the next outward scale is subdivided into eleven parts, twelve parts, thirteen parts and fourteen parts.

Suppose that it is desired to lay off a gear wheel having thirty-six teeth. Then the arm 1 is swung toward the arm 9, one of the fiducial edges 19 of one of the teeth 18 on the indicator 17 coöperating with the proper subdivisions with the innermost circular scale on the head 12. The parts of the other concentric scales may be used in a similar manner, and if the outermost one of the concentric scales is used, single degrees may be laid off, the outermost scale being sub-divided into degrees. After one-fourth of the gear wheel has been laid out, the instrument may be shifted to lay off the next quadrant of the gear wheel, the operation being continued until the periphery of the gear wheel has been completely toothed, it being understood that the inner edges of the arms 9 and 1 are the fiducial edges of the said arms.

The arms 9 and 1 carry studs 50 onto which are threaded nuts 52, a clamping means being provided whereby extensions and attachments of various kinds, which need not be shown, may be connected with the arms.

The head 12 may be provided with a line 60, which, coöperating with the inner fiducial edge of the arm 1, causes the arm 1 to define an angle of forty-five degrees with respect to the arm 9.

Having thus described the invention, what is claimed is:—

1. A device of the class described comprising a first arm provided at its inner end with a hub; a second arm provided at its inner end with an annular head surrounding the hub, the head having circumferential graduations; an indicator superposed on the head, the indicator and the hub being provided with detachably interlocking elements, the indicator having a fiducial edge coöperating with the scale on the head; and means carried by the head and coacting with the indicator for holding the arms at adjusted angles with respect to each other.

2. In a device of the class described, a first arm having a hub; a second arm having a head surrounding the hub and provided with a scale; an indicator superposed on the head, the indicator and the hub being provided with detachably interlocking elements, the indicator having a fiducial edge coacting with the scale of the head, and being provided with an arcuate slot; a stud carried by the head and movable in the slot; and clamping means carried by the stud and coacting with the indicator to hold the arms at adjusted angles with respect to each other.

In testimony that I claim the foregoing as my own, I have hereto affixed my signature in the presence of two witnesses.

JOHN NASH.

Witnesses:
J. H. THOMAS,
WM. AUSLUND.

Copies of this patent may be obtained for five cents each, by addressing the "Commissioner of Patents, Washington, D. C."